United States Patent
Sobel et al.

(10) Patent No.: US 12,204,911 B2
(45) Date of Patent: Jan. 21, 2025

(54) RETIRE QUEUE COMPRESSION

(71) Applicant: Advanced Micro Devices, Inc., Santa Clara, CA (US)

(72) Inventors: Matthew T. Sobel, Boxborough, MA (US); Joshua James Lindner, Boxborough, MA (US); Neil N. Marketkar, Boxborough, MA (US); Kai Troester, Boxborough, MA (US); Emil Talpes, San Mateo, CA (US); Ashok Tirupathy Venkatachar, Fremont, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/497,572

(22) Filed: Oct. 8, 2021

(65) Prior Publication Data
US 2022/0027162 A1    Jan. 27, 2022

Related U.S. Application Data

(63) Continuation of application No. 16/586,642, filed on Sep. 27, 2019, now Pat. No. 11,144,324.

(51) Int. Cl.
*G06F 9/38* (2018.01)

(52) U.S. Cl.
CPC .......... *G06F 9/3856* (2023.08); *G06F 9/3838* (2013.01); *G06F 9/3854* (2023.08); *G06F 9/3858* (2023.08)

(58) Field of Classification Search
None
See application file for complete search history.

(56) References Cited

U.S. PATENT DOCUMENTS

| | | | | |
|---|---|---|---|---|
| 5,761,476 A | * | 6/1998 | Martell | G06F 9/3838 712/217 |
| 5,901,302 A | * | 5/1999 | Witt | G06F 9/3853 711/E12.075 |

(Continued)

OTHER PUBLICATIONS

International Search Report and Written Opinion in International Application No. PCT/US2020/052863, mailed Jan. 15, 2021, 8 pages.

(Continued)

*Primary Examiner* — Michael Sun
(74) *Attorney, Agent, or Firm* — Kowert, Hood, Munyon, Rankin & Goetzel, P.C.; Rory D. Rankin (57) ABSTRACT

Systems, apparatuses, and methods for compressing multiple instruction operations together into a single retire queue entry are disclosed. A processor includes at least a scheduler, a retire queue, one or more execution units, and control logic. When the control logic detects a given instruction operation being dispatched by the scheduler to an execution unit, the control logic determines if the given instruction operation meets one or more conditions for being compressed with one or more other instruction operations into a single retire queue entry. If the one or more conditions are met, two or more instruction operations are stored together in a single retire queue entry. By compressing multiple instruction operations together into an individual retire queue entry, the retire queue is able to be used more efficiently, and the processor can speculatively execute more instructions without the retire queue exhausting its supply of available entries.

20 Claims, 10 Drawing Sheets

(56) References Cited

U.S. PATENT DOCUMENTS

| | | | |
|---|---|---|---|
| 6,026,482 | A | 2/2000 | Witt et al. |
| 6,185,672 | B1 | 2/2001 | Trull |
| 6,381,689 | B2 | 4/2002 | Witt et al. |
| 6,629,233 | B1* | 9/2003 | Kahle .................. G06F 9/3836 |
| | | | 712/217 |
| 6,976,153 | B1* | 12/2005 | Oliver .................. G06F 9/3875 |
| | | | 712/217 |
| 9,235,417 | B2 | 1/2016 | Brandt et al. |
| 9,710,268 | B2* | 7/2017 | Meier .................. G06F 9/3861 |
| 11,144,324 | B2 | 10/2021 | Sobel et al. |
| 2004/0006687 | A1* | 1/2004 | Yoshida ............. G06F 9/30094 |
| | | | 712/220 |
| 2004/0168045 | A1 | 8/2004 | Morris et al. |
| 2010/0070741 | A1 | 3/2010 | Col et al. |
| 2011/0264891 | A1 | 10/2011 | Parks |
| 2014/0019733 | A1 | 1/2014 | Brandt et al. |
| 2014/0337581 | A1* | 11/2014 | Meier ................. G06F 12/0862 |
| | | | 711/123 |
| 2016/0019060 | A1* | 1/2016 | Chatha .................. G06F 9/3832 |
| | | | 712/241 |
| 2016/0364239 | A1 | 12/2016 | Lechenko et al. |
| 2017/0177343 | A1* | 6/2017 | Lai ........................ G06F 9/3016 |
| 2017/0351524 | A1* | 12/2017 | Carlough .............. G06F 9/3838 |
| 2017/0364358 | A1* | 12/2017 | Adeeb .................. G06F 9/3863 |
| 2019/0317762 | A1* | 10/2019 | Okazaki ................ G06F 9/3863 |
| 2020/0026519 | A1 | 1/2020 | Sultana et al. |

OTHER PUBLICATIONS

Office Action for Japanese Patent Application No. 2022-519135, dated Oct. 8, 2024, 11 pp.

Takagi Hideki Others, Examination of Architecture Support for Reducing Register Access, Information Processing Society of Japan Research Report, Japan, Information Processing Society of Japan, Aug. 22, 1997, vol. 97, No. 76, pp. 109-114.

* cited by examiner

| Retire Queue Entry Fields | | | | | |
|---|---|---|---|---|---|
| Dest Arn | Dest Prn | Dest Flags | Dest Frn | ALU Comp | Ld/St Comp Optional |
| 305 | 310 | 315 | 320 | 325 | 330  332 |

| Instruction # | Instruction | Op # | Op Mnemonic | Dest Arn/Prn | Dest Flags/Frn | ALU Comp | Ld/St Comp | RetQ Compress? | RetQ Entry # |
|---|---|---|---|---|---|---|---|---|---|
| 0 | Add [RAX+RBX], RCX | 0 | Ld Temp, [RAX+RBX] |  |  |  | x | Yes | 0 |
| 0 |  | 1 | Add [RAX+RBX], Temp | x | x | x |  |  | 0 |
| 1 | JNZ 0x04 | 2 | JNZ 0x04 | x |  | x |  | No | 1 |
| 2 | MOV R08, [R04] | 3 | MOV R08, [R04] | x |  |  | x | Yes | 2 |
| 3 | CMP RAX, RBX | 4 | CMP RAX, RBX |  | x | x |  |  | 2 |

| | Integrated Retire Queue Fields | | | | | | | | | |
|---|---|---|---|---|---|---|---|---|---|---|
| IntDestAm | IntDestPm | IntDestFlags | IntDestFm | FpDestAm | FpDestPm | FpDestFm | FpDestFlags | ALU Comp | Ld/St Comp | Fp Comp |
| 402 | 404 | 406 | 408 | 410 | 412 | 414 | 416 | 418 | 420 | 422 |

| Inst. # | Instruction | Op # | Op Mnemonic | IntDest Am/Pm | IntDest Flags/Fm | FpDest Am/Pm | FpDest Flags/Fm | ALU Comp | Ld/St Comp | Fp Comp | RetQ Compress? | RetQ Entry # |
|---|---|---|---|---|---|---|---|---|---|---|---|---|
| | | | | 435 | 440 | 445 | 450 | 455 | 460 | 465 | 470 | 475 |
| 0 | MOV [RBX], RCX | 0 | MOV [RBX], RCX | | | | | | x | | No | 0 |
| 1 | VMOVAPD YMM0, [RAX] | 1 | VMOVAPD YMM0, [RAX] | | | x | | | x | x | Yes | 1 |
| 2 | JNZ 0x04 | 2 | JNZ 0x04 | | | | | x | | | | 1 |
| 3 | MOV R08, [R04] | 3 | MOV R08, [R04] | x | | | | | x | | Yes | 2 |
| 4 | ADDPD XMM0, XMM1 | 4 | ADDPD XMM0, XMM1 | | | x | x | | | x | | 2 |

RETIRE QUEUE COMPRESSION

CROSS REFERENCE TO RELATED APPLICATIONS

This application is a continuation of U.S. patent application Ser. No. 16/586,642, now U.S. Pat. No. 11,144,324, entitled "RETIRE QUEUE COMPRESSION", filed Sep. 27, 2019, the entirety of which is incorporated herein by reference.

BACKGROUND

Description of the Related Art

A processor pipeline includes many different units which operate on instructions being executed. These units include a decode unit, scheduler unit, pickers, and execution units. The decode unit decodes fetched instructions into instruction operations. Instruction operations are also referred to as "operations" or "ops" herein. Generally speaking, an op is an operation that the hardware included in the execution units is capable of executing. In various implementations, each instruction translates to one or more operations which, when executed, result in the performance of the operations defined for that instruction according to an instruction set architecture.

An out-of-order processor requires an in-order queue of dispatched operations to update architectural state in-order as operations are retired. This in-order queue is referred to herein as a "retire queue". Also, as used herein, the term "retire" is defined as updating the architectural state of the processor with the results of an operation while also freeing the temporary storage locations that were allocated for the operation. In some processors, complex instructions are broken up into one or more operations when dispatched to the execution unit so as to limit the complexity of the scheduler, arithmetic logic, and address generation units. For example, in the x86 instruction set architecture (ISA), a load-ex-store form is supported for many instructions. The load-ex-store form involves loading a value from memory, performing an operation on the value, and then writing the result back to memory. This may be dispatched to the scheduling unit as up to three operations, such as a load, an arithmetic operation, and a store. Typically each dispatched operation would consume a retire queue entry. Consequently, a single instruction could consume multiple retire queue entries. This means the supply of available entries in the retire queue can be quickly exhausted. When this happens, the processor will stall until more retire queue entries become available. The availability of entries in the retire queue sets a limit on how far into speculation a processor can operate which impacts the processor's performance (e.g., instructions per cycle (IPC)).

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for compressing retire queue entries are disclosed herein. A system includes one or more processors coupled to one or more memories. Each processor includes at least a scheduler, a retire queue, one or more execution units, and control logic. Since reducing the number of retire queue entries that an instruction consumes would be beneficial to processor performance, the control logic tries to compress multiple instruction operations together into a single retire queue entry. Accordingly, in one implementation, when the control logic detects a given instruction operation being dispatched by the scheduler to an execution unit, the control logic determines if the first instruction operation meets one or more conditions for being compressed with one or more other instruction operations into a single retire queue entry. The one or more conditions for compressing instruction operations can include the instruction operations being dispatched together, the instruction operations not exceeding the available fields in a single retire queue entry, the instruction operations being able to be retired together, a redirect operation not being possible in between the instruction operations, and/or other conditions. If these conditions are met, two or more instruction operations are stored together in a single retire queue entry. By compressing multiple instruction operations together into an individual retire queue entry, the retire queue is able to be used more efficiently, and the processor can speculatively execute more instructions without the retire queue exhausting its supply of available entries.

Figure 1:
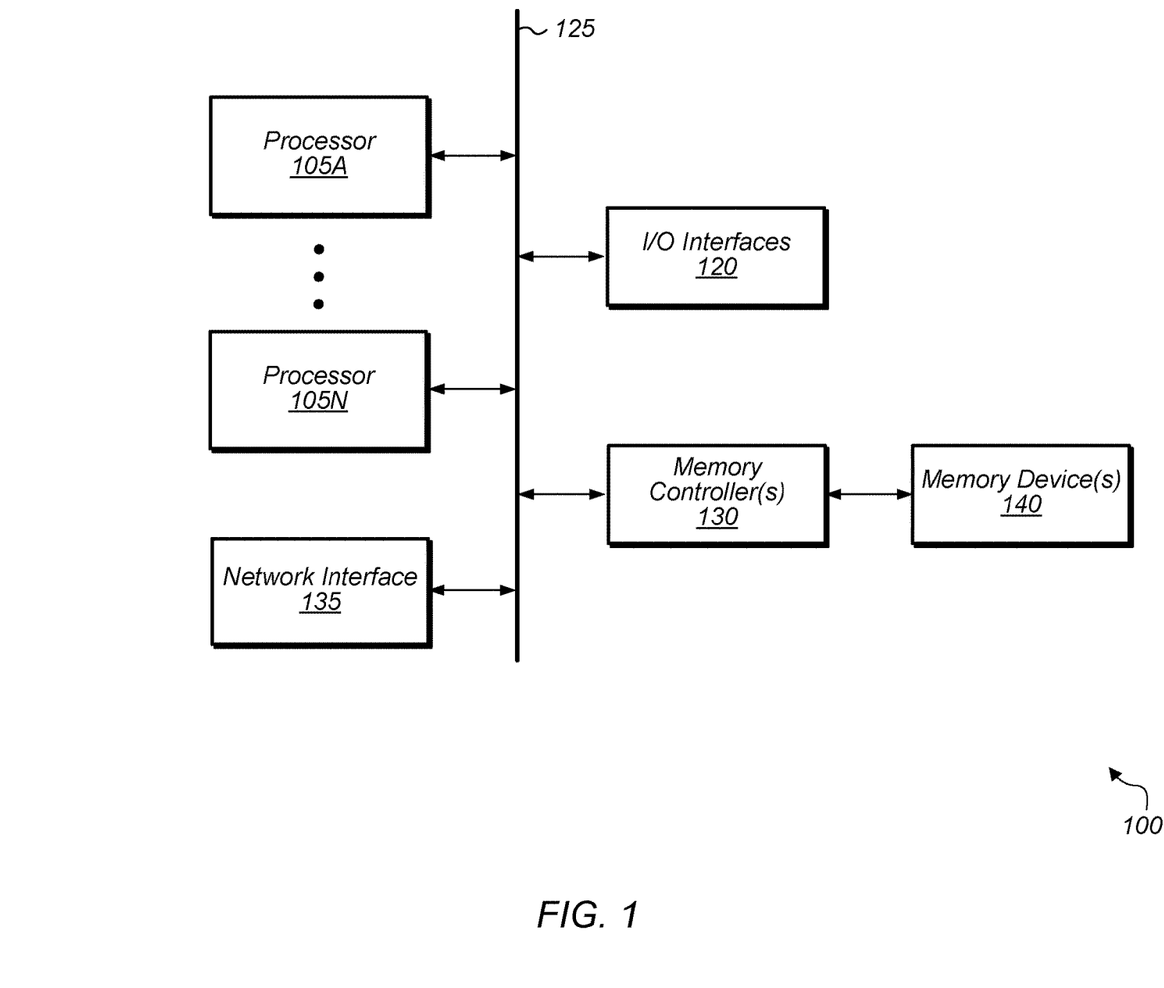
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, and memory device(s) 140. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors.

Memory controller(s) 130 are representative of any number and type of memory controllers accessible by processors 105A-N and I/O devices (not shown) coupled to I/O interfaces 120. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
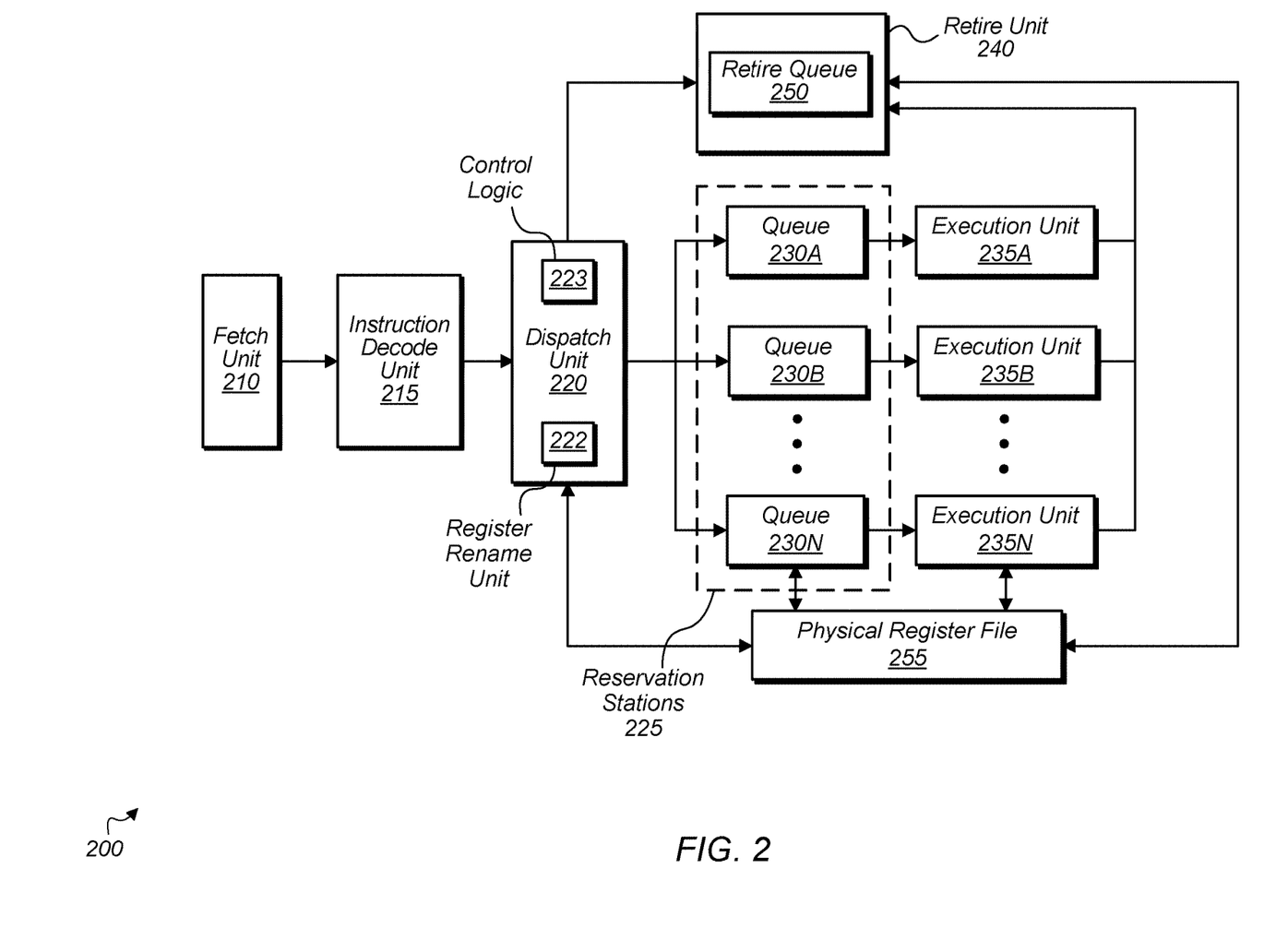
FIG. 2 is a block diagram of one implementation of a processor pipeline.

Turning now to FIG. 2, a block diagram of one implementation of a processor pipeline 200 is shown. In various implementations, processors 105A-N (of FIG. 1) include one or more instantiations of processor pipeline 200. In one implementation, processor pipeline 200 includes at least fetch unit 210, decode unit 215, dispatch unit 220, reservation stations 225, execution units 235A-N, and retire unit 240. It should be understood that processor pipeline 200 also includes other components (e.g., branch prediction unit, instruction cache) which are not shown to avoid obscuring the figure. In other implementations, processor pipeline 200 is structured in other suitable manners.

In one implementation, fetch unit 210 fetches instructions of a program stream from memory and/or an instruction cache, and fetch unit 210 conveys the fetched instructions to instruction decode unit 215. Instruction decode unit 215 decodes each instruction into one or more instruction operations (or ops for short). It is noted that ops are also referred to as micro-ops or μops. Generally, an instruction operation is an operation that the hardware included in execution units 230A-N is capable of executing. In various implementations, each instruction translates to one or more ops which, when executed, result in the performance of the operations defined for that instruction according to the instruction set architecture. Any type of instruction set architecture is employed by processor pipeline 200.

The ops from instruction decode unit 215 are provided to dispatch unit 220, and dispatch unit assigns the ops to queues 230A-N. It is noted that queues 230A-N can also be referred to as reservation stations 225, with each queue referred to as a reservation station. It is also noted that reservation stations 225 can also be referred to as a "scheduler" or "scheduler unit". As shown in processor pipeline 200, each queue 230A-N is coupled to a corresponding execution unit 235A-N. However, in other implementations, one or more queues 230A-N can be coupled to multiple execution units 235A-N.

In one implementation, dispatch unit 220 includes a register rename unit 222 for mapping architectural register specifiers to physical register specifiers referring to actual physical registers in physical register file (PRF) 255. In another implementation, the register rename unit 222 is a separate structure from dispatch unit 220. Out of order microprocessors use register renaming to extract parallelism and improve performance. Once the hardware has allocated all of the available physical register numbers (PRNs) corresponding to locations in PRF 255, the instruction decode pipeline is stalled until physical registers in the PRF 255 become available again. In one implementation, to help prevent the instruction decode pipeline from stalling, intermediate data generated during a sequence of ops is stored directly in the reservation station of the dependent op without using PRF 255. In many cases this intermediate data is needed by only one dependent op. More efficient use of PRF 255 increases processor performance by allowing the out-of-order window to span more instructions before running out of physical registers. This also allows for more opportunities to compress multiple ops into a single entry in retire queue 250, which will be discussed in more detail below.

For example, when an x86 instruction having the load-execute form is executed, the first operand comes from a register but the second operand must first be loaded from memory before an Arithmetic and Logic Unit (ALU) can execute the instruction. In this case the instruction decomposes into two ops: a load address generation (AGEN) op and an ALU op. In one implementation, a single reservation station entry is allocated for the instruction, with the entry containing the ALU register operand and the AGEN operands. In this implementation, both ops issue from the same reservation station entry. After the AGEN op issues, an AGEN operand is overwritten with the load data such that the reservation station entry now contains the ALU register operand and the ALU operand loaded from memory. Rather than addressing a PRF entry, the Physical Register Number (PRN) broadcast for this load data uses a special tag to directly address the appropriate reservation station entry.

Then, the ALU op issues without having written the intermediate load data back to the PRF 255. The storage of intermediate data in the reservation stations 225 can be applied to sequences of micro-ops derived from a single instruction or multiple instructions fused together in order to take advantage of this mechanism.

When dependencies are resolved and the ops are ready to execute, pickers (not shown) will pick the ops out of queues 230A-N to execute on the execution units 235A-N. The execution units 235A-N are representative of any number and type of execution units. For example, any of various types including, but not limited to, an integer execution unit, floating point execution unit, load/store unit, arithmetic logic unit, and address generation unit can be included in execution units 235A-N. Additionally, execution units 235A-N can include more than one unit of a specific type. For example, in one implementation, execution units 235A-N include two integer execution units.

Entries in retire queue 250 are allocated and ops are written into the entries at dispatch time. Some of the fields of the retire queue entries can be written based on execution results after ops are executed by execution units 235A-N. The entries are maintained in retire queue 250 until the corresponding ops become non-speculative, at which point the ops are retired in-order. Dispatch unit 220 includes control logic 223 which determines if two or more ops can be compressed into a single entry of retire queue 250. In one implementation, two or more ops are compressed into a single entry of retire queue 250 if the two or more ops meet one or more conditions. Depending on the implementation, the conditions include the two or more ops being dispatched together, the two or more ops being allowed to architecturally retire together, all of the completions for the two or more ops can be tracked in a single retire queue entry, all architectural state updated by the two or more ops can be tracked in a single retire queue entry, and there being no possibility of a program redirect occurring in between the two or more ops. If the two or more ops do not meet the required conditions, then each op is stored in a separate entry of retire queue 250.

Once the results from an op become non-speculative, the results from the op are used to update the architectural state of the processor and the op is retired from retire queue 250. When two or more ops are compressed together into a given entry in retire queue 250 and the two are more ops are ready to be retired, the results from the two or more ops update the architectural state of the processor at the same time. In some cases, the processor will need to recover the architectural state after the first compressed op but before the second compressed op in a given entry. For example, an exception can cause the processor to stop retirement on the corresponding instruction. In one implementation, to deal with this scenario, the processor flushes all of the younger in-flight ops and replays the instructions without compressing ops into retire queue 250.

Figure 3:
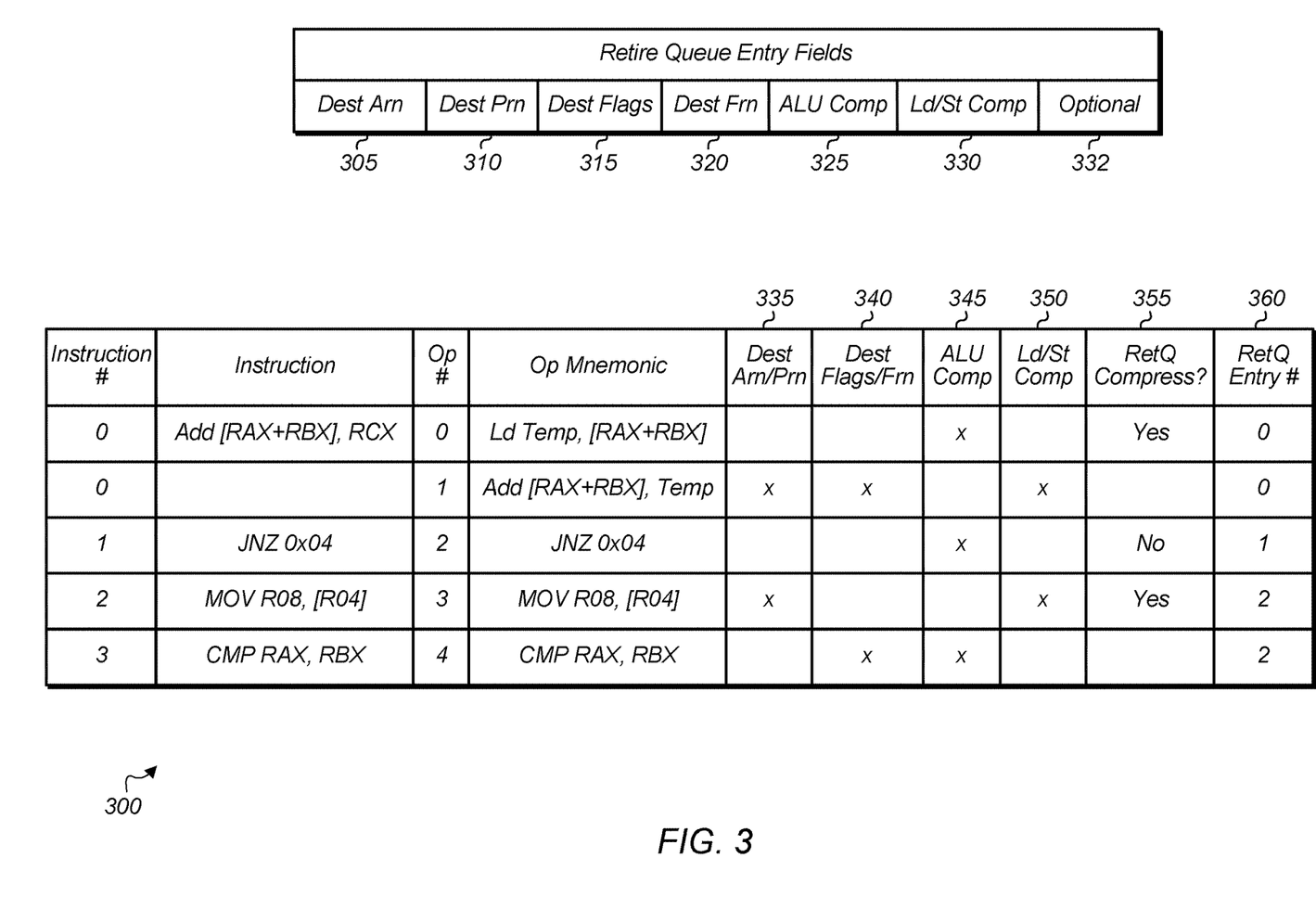
FIG. 3 illustrates a table used for determining whether ops can be compressed into retire queue entries in accordance with one implementation.

Referring now to FIG. 3, a table 300 used for determining whether ops can be compressed into retire queue entries in accordance with one implementation is shown. Table 300 includes sample instructions which could be encountered in an example program sequence in one particular implementation. In one implementation, control logic creates table 300 (or some other similar structure) for help in determining whether a group of ops can be compressed together into a single retire queue entry. Alternatively, rather than creating table 300 or a similar structure, the control logic includes circuitry which performs the decision making based on values indicated by the different fields 335-355 of table 300.

The first entry in table 300 is for the instruction "Add [RAX+RBX], RCX". This instruction gets converted into two ops, with the first op "Ld Temp, [RAX+RBX]" a load operation and the second operation "Add [RAX+RBX], Temp" an add operation. In one implementation, the "Temp" identifier (ID) does not identify a physical register number. Rather, the "Temp" location specifies a particular reservation station entry. Using the "Temp" ID to specify a reservation station entry rather than a physical register number helps to reduce usage of physical registers. Using the "Temp" ID to specify a reservation station entry also creates more opportunities for compressing ops together into a single retire queue entry.

The fields 335-350 in table 300 are used to indicate which parts of the architectural state will be updated by each op. The parts of the architectural state correspond to the different fields of a retire queue entry that will be occupied by an op. The example fields 305-330 of a retire queue entry in accordance with one implementation are shown at the top of the figure. For example, in one implementation, the fields of a retire queue entry include a destination architectural register number (Arn) field 305, a destination physical register number (Prn) field 310, a destination flags field 315, a destination free flag register number (Frn) field 320, an arithmetic logic unit (ALU) completion field 325, and a load/store completion field 330. In other implementations, a retire queue entry can have other types of fields. For example, in some implementations, a retire queue entry can include one or more optional fields 332 to allow more ops to be compressed into a single retire queue entry.

For the entry in table 300 for op #0 of the first instruction, the arithmetic logic unit (ALU) completion (comp) field 345 is set indicating that op #0 needs to use the ALU completion field 325 of a retire queue entry. The other fields of retire queue entry #0 will not be used by op #0. For the entry in table 300 for op #1 of the first instruction, the destination Arn/Prn field 335 is set to indicate that the destination Arn field 305 and the destination Prn field 310 of a retire queue entry will be used. Also, the destination flags/Frn field 340 is set to indicate that the destination flags field 315 and the destination Frn field 320 of a retire queue entry will be used. Since there is no overlap in the fields 335-350 for ops #0 and 1 in their entries of table 300, these two operations can share a single retire queue entry (entry #0). This is indicated in the first entry of table 300 by the "Yes" entered in the retire queue compressibility "RetQ Compress?" field 355. In general, if there is no overlap in the retire queue entry fields being occupied by consecutive operations, then these operations can be compressed into a single retire queue entry. However, other factors can prevent two consecutive operations with no overlap from being compressed together into a single retire queue entry. An example of another factor preventing the compression of consecutive ops will be shown with the next instruction.

The next instruction shown in table 300 is the instruction "JNZ 0x04". This instruction is labeled as instruction #1 and the op is labeled as op #2. The instruction "JNZ 0x04" only maps to a single operation. This operation is not able to be compressed into the next retire queue entry with any subsequent operations because this would violate the rule that a branch must be the last operation in a retire queue entry. Accordingly, operation "JNZ 0x04" is not compressed with any other operations, and so operation "JNZ 0x04" has its own retire queue entry (entry #1) as indicated in field 360.

The next instruction, labeled as instruction #2, is the instruction "MOV R08, [R04]". This instruction is mapped to a single op, which is labeled as op #3. The destination Arn/Prn field 335 is set for this op in the corresponding entry of table 300, and the load/store completion field 350 is also set for this op. The subsequent instruction, labeled as instruction #4, is the instruction "CMP RAX, RBX". This instruction is decoded into a single op, which is labeled as op #4. The destination flags/Frn field 340 is set for this op in the corresponding entry of table 300, and the ALU completion field 345 is also set for this op. Since there is no overlap between the entries in table 300 for ops #3 and #4, and since ops #3 and #4 meet the other criteria for being compressed into a single retire queue entry, the retire queue compressibility field 355 is set for the entry in table 300 for op #3. Accordingly, as indicated by field 355, ops #3 and #4 are compressed together into retire queue entry #2. It is noted that ops derived from other instructions can be analyzed in a similar manner using the fields of table 300 to determine whether adjacent ops can be compressed together into a single retire queue entry.

Figure 4:
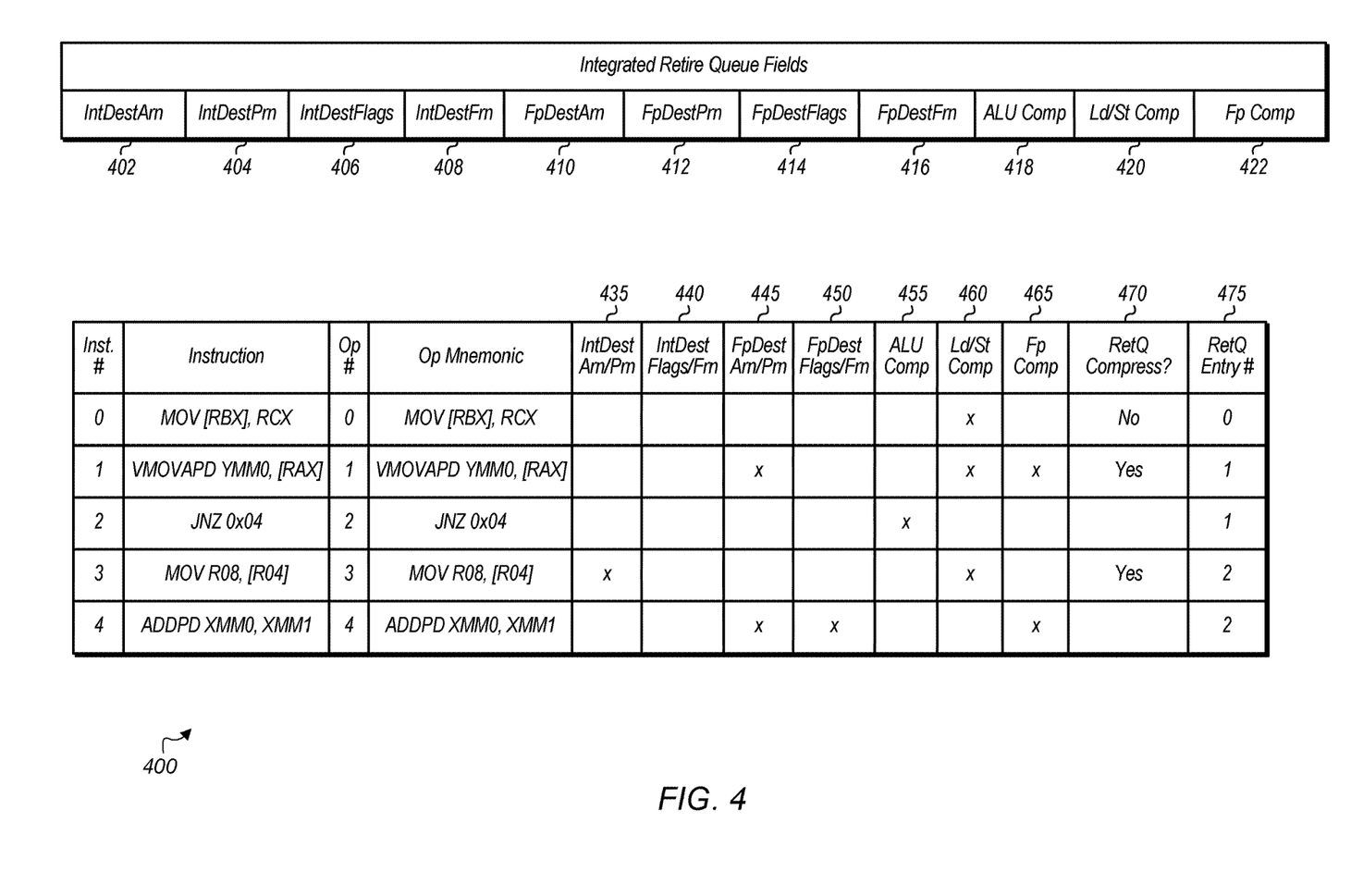
FIG. 4 illustrates another example of a table used for tracking the potential compressibility of ops into retire queue entries in accordance with one implementation.

Turning now to FIG. 4, another example of a table 400 used for tracking the potential compressibility of ops into retire queue entries in accordance with one implementation is shown. The example of table 400 is intended to illustrate an implementation of attempting to compress integer and/or floating point ops into a single combined retire queue entry. The first instruction #0 listed in table 400 is instruction "MOV [RBX], RCX" which has a single op #0. The load/store completion field 460 is set for op #0, and the retire queue compressibility field 470 is set to "No" to indicate that op #0 is not compressible with other operations. Accordingly, op #0 is stored by itself in the retire queue entry #0 as indicated by field 475.

The next instruction #1 listed in table 400 is the instruction "VMOVAPD YMM0, [RAX]" which maps to a single op #1. The floating point destination Arn/Prn field 445 is set for op #1, as are the load/store completion field 460 and the floating point completion field 465. The retire queue compressibility field 470 is set to "Yes" for op #1 indicating that op #1 can be compressed into the same retire queue entry (entry #1) with op #2. The next instruction #2 listed in table 400 is the "JNZ 0x04" instruction. The only field set for op #2 in the corresponding entry of table 400 is the ALU completion field 455. Even though op #2 is a branch operation, op #2 is able to be compressed with op #1 since op #2 will be the last operation stored in the retire queue entry (entry #1).

The next instruction "MOV R08, [R04]" maps to a single op #3. The entry for op #3 has the integer destination Arn/Prn field 435 set as well as the load/store completion field 460. Field 470 of the entry for op #3 indicates that operation #3 is compressible into a single retire queue entry (entry #2) with op #4. Op #4 is derived from instruction #4 which is the "ADDPD XMM0, XMM1" instruction shown in the last entry of table 400. Op #4 has the floating point destination Arn/Prn field 445 set, the floating point destination flags/Frn field 450 set, and the floating point completion field 465 set.

An example of a retire queue entry is shown at the top of FIG. 4 with fields 402-422. In this example, integer destination architectural register number (Arn) field 402 and integer destination physical register number (Prn) field 404 correspond to field 435 of table 400. Similarly, integer destination flag field 406 and integer destination Frn field 408 of the entry correspond to field 440 of table 400, floating point destination Arn field 410 and floating point destination Prn field 412 of the entry correspond to field 445 of table 400, floating point destination flags field 414 and floating point destination Frn field 416 of the entry correspond to field 450 of table 400, and ALU completion field 418, Load/Store completion field 420, and floating point completion field 422 correspond to fields 455, 460, and 465, respectively, of table 400. In other implementations, a retire queue entry can have other numbers and/or types of fields. In these implementations, table 400 will have additional fields that correspond to these other types of fields.

Figure 5:
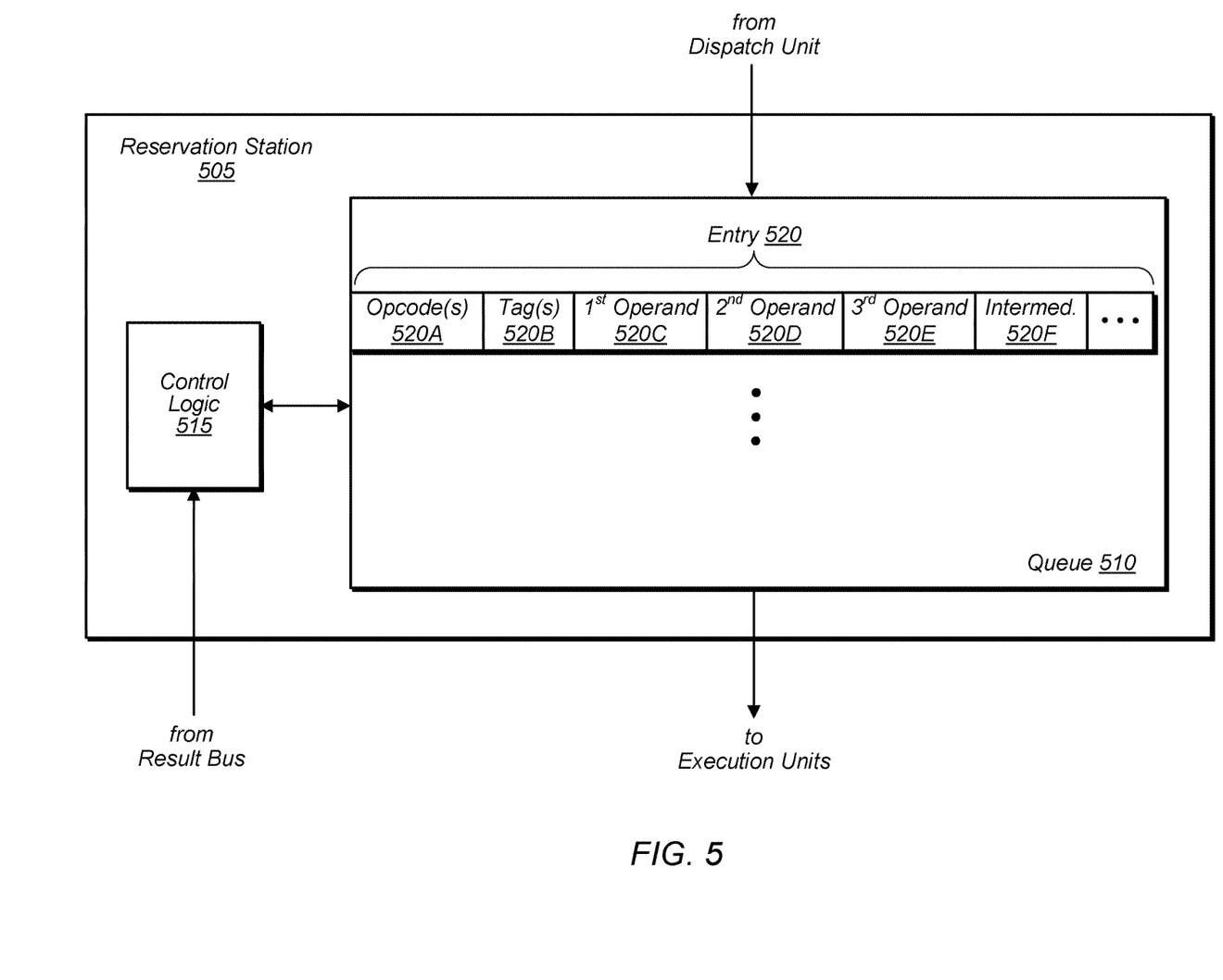
FIG. 5 is a block diagram of one implementation of a reservation station.

Referring now to FIG. 5, a block diagram of one implementation of a reservation station 505 is shown. In one implementation, reservation station 505 includes queue 510 and control logic 515. Queue 510 includes storage for any number of entries for ops dispatched from a dispatch unit (not shown), with the storage capacity varying according to the implementation. One example of an entry 520 is shown in accordance with one implementation. In other implementations, other types of entries with other types of fields can be supported by queue 510.

As shown in queue 510, entry 520 includes opcode field(s) 520A, tag field(s) 520B, first operand field 520C, second operand field 520D, third operand field 520E, intermediate indicator field 520F, and any number of other fields. In one implementation, entry 520 is capable of storing opcodes and tags for multiple ops issued by the dispatch unit. For example, for a load-execute form of an instruction, two ops share a single entry 520, with both ops issuing from this single entry 520. In this example, the single entry 520 is allocated with the ALU register operand stored in field 520C and the address generation (AGEN) operands stored in fields 520D and 520E. After the AGEN op issues, an AGEN operand in field 520D is overwritten with an ALU operand loaded from memory. The physical register number (PRN) broadcast for this load data uses a special tag to directly address reservation station 505 which will be buffering the load data rather than a PRF entry. In one implementation, control logic 515 detects this special tag on the result bus and retrieves the load data to overwrite field 520D. Accordingly, after the AGEN op issues, entry 520 includes an ALU register operand stored in field 520C and an ALU operand loaded from memory stored in field 520D. Additionally, in one implementation, the intermediate indicator field 520F is set after the AGEN op issues. In this implementation, when the intermediate indicator field 520F is set, this denotes that the second op sharing this entry is ready to be issued.

In other implementations, other combinations of ops can share a single entry 520 of reservation station 505. For example, two or more ops from different instructions can share a single entry in reservation station 505 in another implementation. These two or more ops will also issue from the same entry. By sharing entries in reservation station 505 and storing intermediate data in these shared entries, the number of physical registers that are used is reduced. This allows more instructions to be speculatively executed without exhausting the supply of available physical registers. Also, reducing the usage of physical registers opens up additional opportunities for compressing multiple ops together into retire queue entries.

Figure 6:
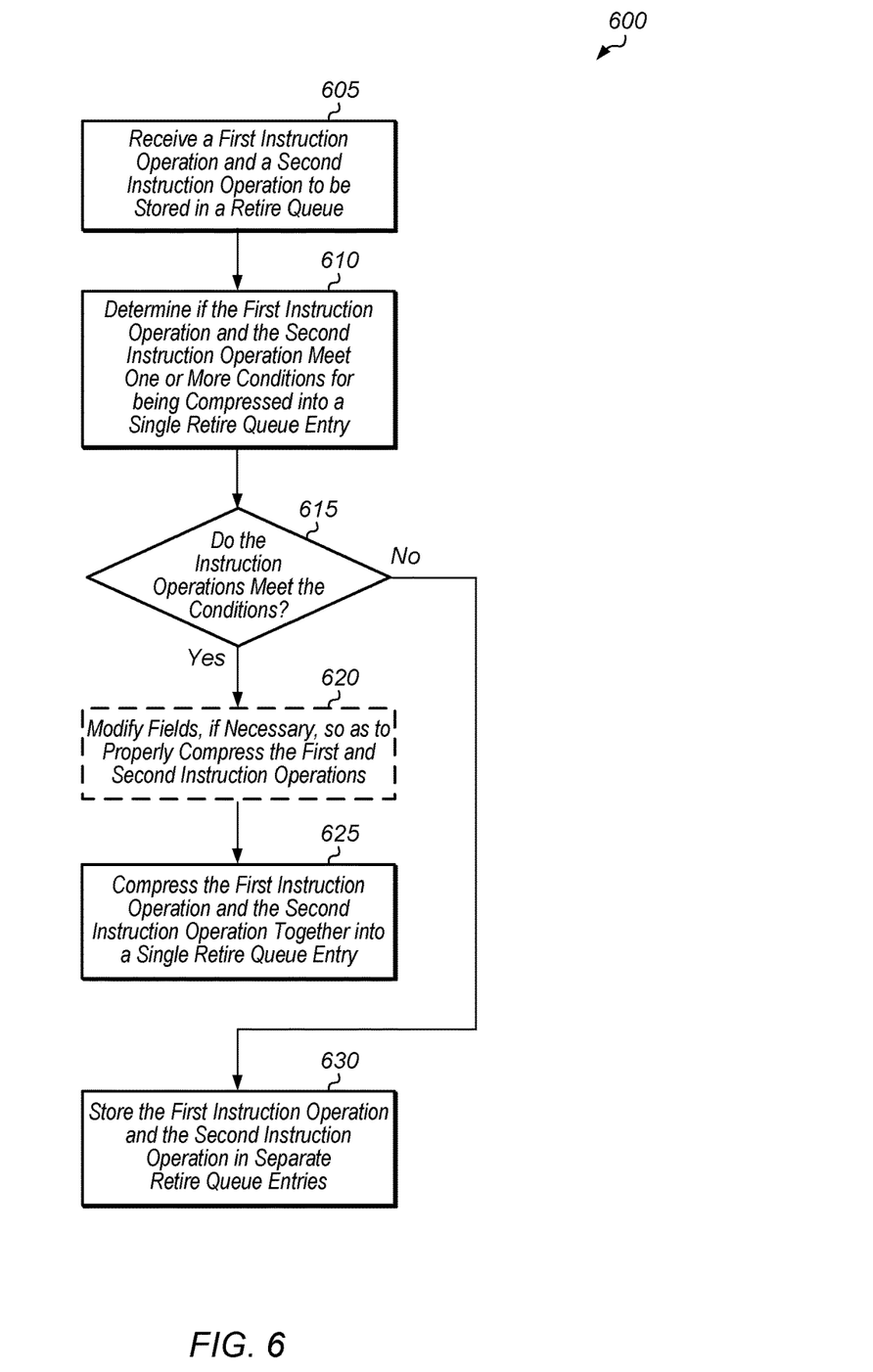
FIG. 6 is a generalized flow diagram illustrating one implementation of a method for compressing instruction operations into retire queue entries.

Turning now to FIG. 6, one implementation of a method 600 for compressing instruction operations into retire queue entries is shown. For purposes of discussion, the steps in this implementation and those of FIG. 7-10 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 600.

Control logic receives a first instruction operation and a second instruction operation to be stored in a retire queue (block 605). In one implementation, the first instruction operation and a second instruction operation are derived from a single instruction. In another implementation, the first instruction operation and a second instruction operation are derived from separate instructions. The control logic determines if the first instruction operation and the second instruction operation meet one or more conditions for being compressed into a single retire queue entry (block 610). Depending on the implementation, the one or more conditions include the first and second instruction operations being dispatched together, the first and second instruction operations being allowed to architecturally retire together, all of the completions for the first and second instruction operations are able to be tracked in a single retire queue entry, all architectural state updated by the first and second instruction operations is able to be tracked in a single retire queue entry, and there being no possibility of a program redirect occurring in between the first and second instruction operations. In other implementations, other conditions can be checked in block 610. In some cases, the control logic determines whether three or more instruction operations can be compressed together into a single retire queue entry in block 610.

If the first and second instruction operations meet the one or more conditions (conditional block 615, "yes" leg), then the fields corresponding to the first instruction operation and the second instruction operation are modified, if necessary, so as to properly compress the first and second instruction operations (optional block 620). Next, the first instruction operation and the second instruction operation are compressed together into a single retire queue entry (block 625). Otherwise, if the first and second instruction operations do not meet the one or more conditions (conditional block 615, "no" leg), then the first instruction operation and the second instruction operation are stored in separate retire queue entries (block 630). After blocks 625 and 630, method 600 ends. It is noted that in another implementation, more than two different instruction operations can be compressed into a single retire queue entry using method 600.

Figure 7:
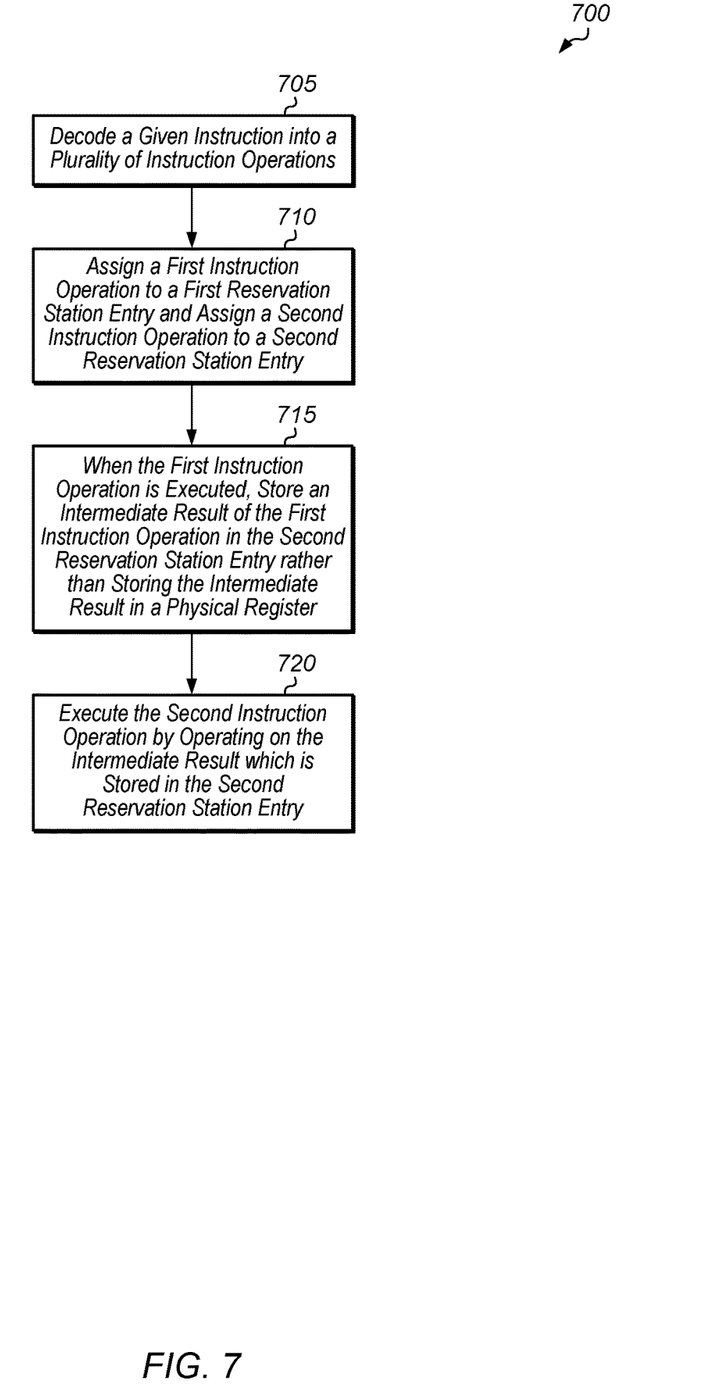
FIG. 7 is a generalized flow diagram illustrating one implementation of a method for storing intermediate data in a reservation station.

Referring now to FIG. 7, one implementation of a method 700 for storing intermediate data in a reservation station is shown. A given instruction is decoded into a plurality of instruction operations (block 705). It will be assumed for the rest of the discussion of method 700 that the given instruction is split into two instruction operations. These two instruction operations are referred to as a first instruction operation and a second instruction operation for this discussion. However, it should be understood that this is merely indicative of one implementation. In other implementations, the given instruction can be split into more than two instruction operations. Next, a first instruction operation is assigned to a first reservation station entry and the second instruction operation is assigned to a second reservation station entry (block 710). It is also assumed for the purposes of this discussion that the first instruction operation is generating an intermediate result that will be operated on by the second instruction operation. In another implementation, the first and second instruction operations are stored in a single reservation station entry.

When the first instruction operation is executed, an intermediate result of the first instruction operation is stored temporarily in the second reservation station entry rather than being stored in a physical register (block 715). Next, the second instruction operation is executed by operating on the intermediate result which is stored in the second reservation station entry (block 720). The execution of the second instruction operation can also operate on one or more other operands. After block 720, method 700 ends. By storing the intermediate result in the second reservation station entry rather than using a physical register, this allows the physical register to be used by another instruction operation. This also helps to prevent situations where the processor pipeline has allocated all of the available physical register numbers. When the processor pipeline has exhausted the resources of the physical registers, the processor pipeline will be stalled until more physical registers become available. Method 700 helps to prevent this from happening. It is noted that in other implementations, more than one intermediate result can be stored in a reservation station entry. Also, in other implementations, one intermediate result can be written to multiple reservation station entries if there are multiple dependent instruction operations that use the intermediate result.

Figure 8:
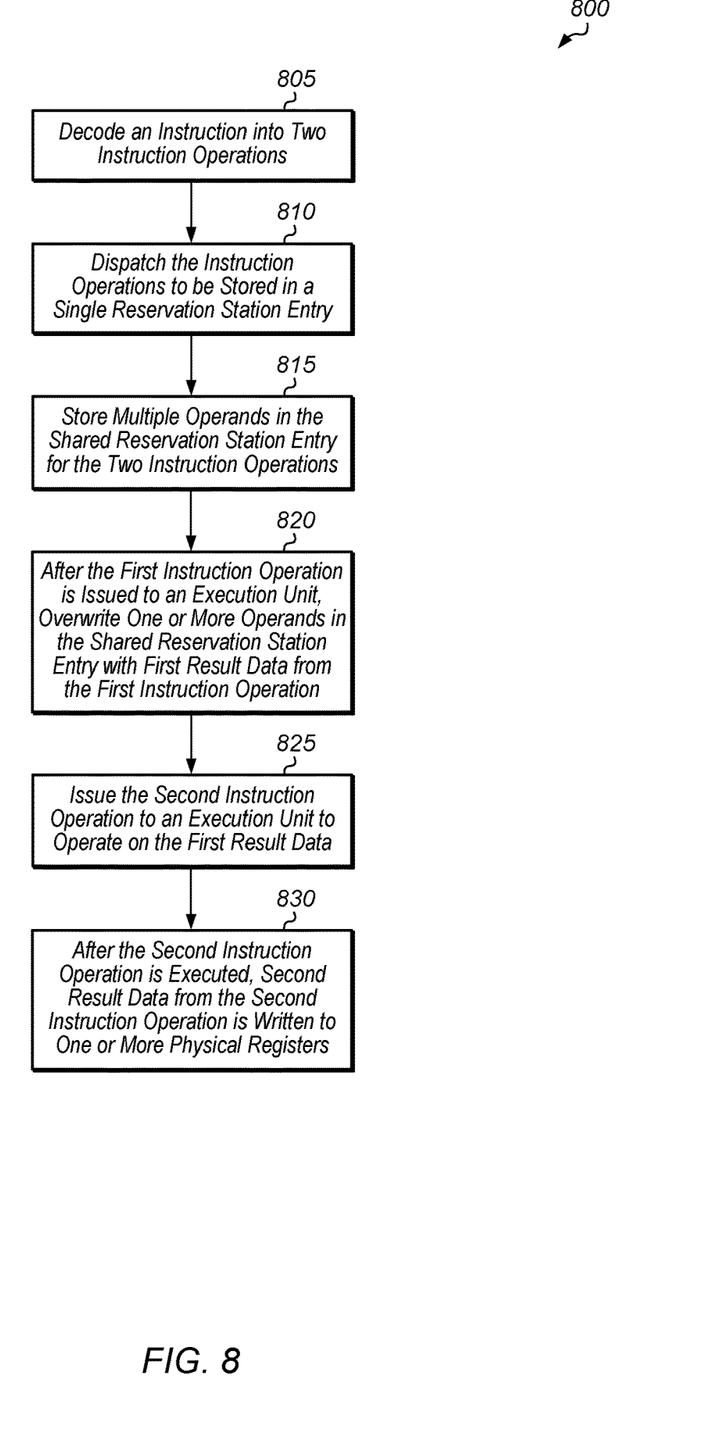
FIG. 8 is a generalized flow diagram illustrating one implementation of a method for sharing a reservation station entry among multiple instruction operations.

Turning now to FIG. 8, one embodiment of a method 800 for sharing a reservation station entry among multiple instruction operations is shown. An instruction is decoded into two instruction operations (block 805). In other implementations, the instruction is decoded into three or more instruction operations. A dispatch unit dispatches the two instruction operations to be stored in a single reservation station entry (block 810). Multiple operands are stored in the shared reservation station entry for the two instruction operations (block 815). After the first instruction operation is issued to an execution unit, one or more operands in the shared reservation station entry are overwritten by first result data from the first instruction operation (block 820). Then, the second instruction operation is issued to an execution unit to operate on the first result data stored in the shared reservation entry (block 825). After the second instruction operation is executed, second result data from the second instruction operation is written to one or more physical registers (block 830). After block 830, method 800 ends. It is noted that in other implementations, other numbers of instruction operations can share a single reservation station entry. Additionally, these instruction operations can originate from different instructions in some implementations.

Figure 9:
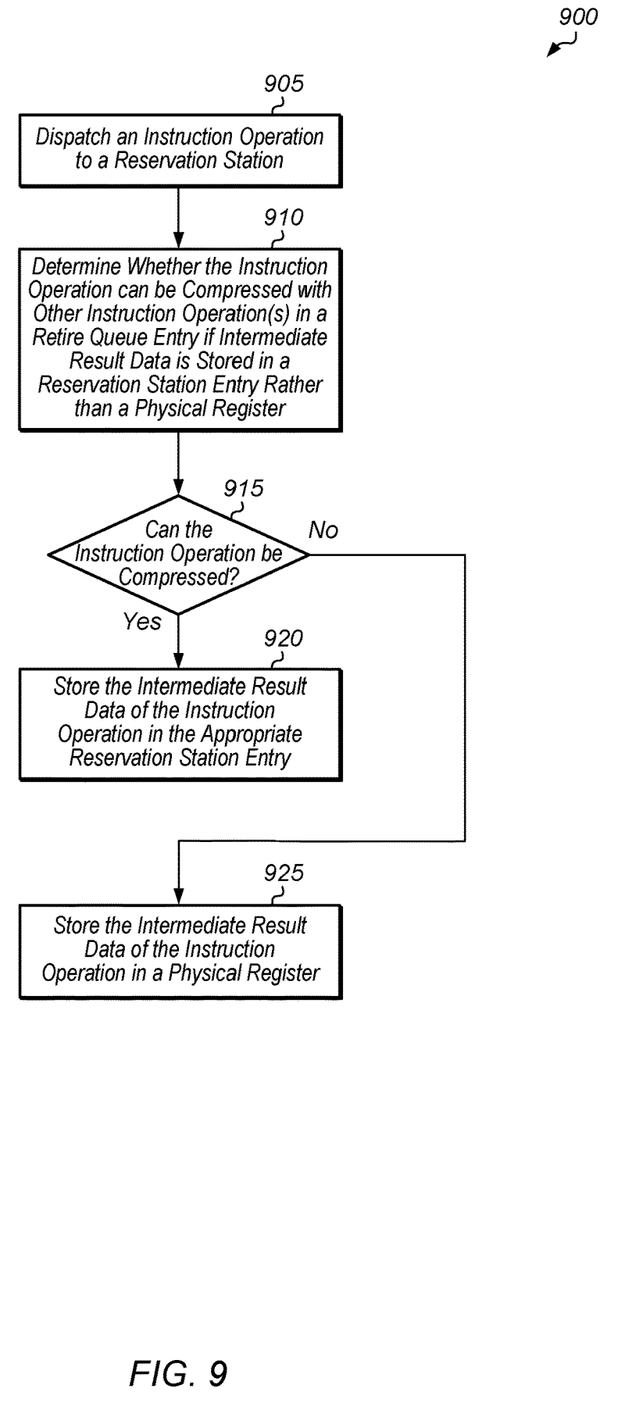
FIG. 9 is a generalized flow diagram illustrating one implementation of a method for reducing the number of physical registers used by an instruction operation so as to increase the compressibility of retire queue entries.

Referring now to FIG. 9, one implementation of a method 900 for reducing the number of physical registers used by an instruction operation so as to increase the compressibility of retire queue entries is shown. An instruction operation is dispatched to a reservation station by a dispatch unit (block 905). Next, control logic in the reservation station determines whether the instruction operation can be compressed with one or more other instruction operations in a retire queue entry if intermediate result data of the instruction operation is stored in a reservation station entry rather than a physical register (block 910). It is noted that the ability to compress instruction operations in a retire queue entry is not a prerequisite for using reservation stations for intermediate results. It should be understood that while block 910 describes the decision of whether to store intermediate result data in a reservation station entry as being dependent on whether the instruction operation is compressible with other instruction operations in a retire queue entry, this is merely indicative of one implementation. In other implementations, the decision on whether to store intermediate result data in a reservation station entry is made independently of compressing instruction operations in a retire queue entry. In some cases, even if instruction operations are not compressible in a retire queue entry, it can still be beneficial to use the reservation station for storing intermediate data. Accordingly, while method 900 describes the decision making for storing intermediate result data in a reservation station entry and compressing retire queue entries as being linked together, this is presented as an example as one implementation. Other implementations can separate the decision making on whether to store intermediate result data in a reservation station entry from the decision making on whether to compress retire queue entries.

If the control logic determines that the instruction operation can be compressed in a retire queue entry (conditional block 915, "yes" leg), then intermediate result data of the instruction operation is stored in the appropriate reservation station entry (block 920). In one implementation, a requirement for storing the intermediate result data in the reservation station entry is that the instruction operation's result is only ever sourced by one other instruction operation and any architectural state updated by the instruction operation is overwritten by the other instruction operation. By storing the intermediate result data of the instruction operation in a reservation station entry, this allows a physical register to be used by another instruction operation and reduces the number of fields used by the instruction operation in the retire queue entry, increasing the probability of the instruction operation being able to be compressed with other instruction operations. In one implementation, the appropriate reservation station entry is the entry corresponding to a dependent instruction operation which will operate on the intermediate result data. Otherwise, if the control logic determines that the instruction operation is not compressible in a retire queue entry (conditional block 915, "no" leg), then the intermediate result data of the instruction operation is stored in a physical register (block 925). After blocks 920 and 925, method 900 ends.

Figure 10:
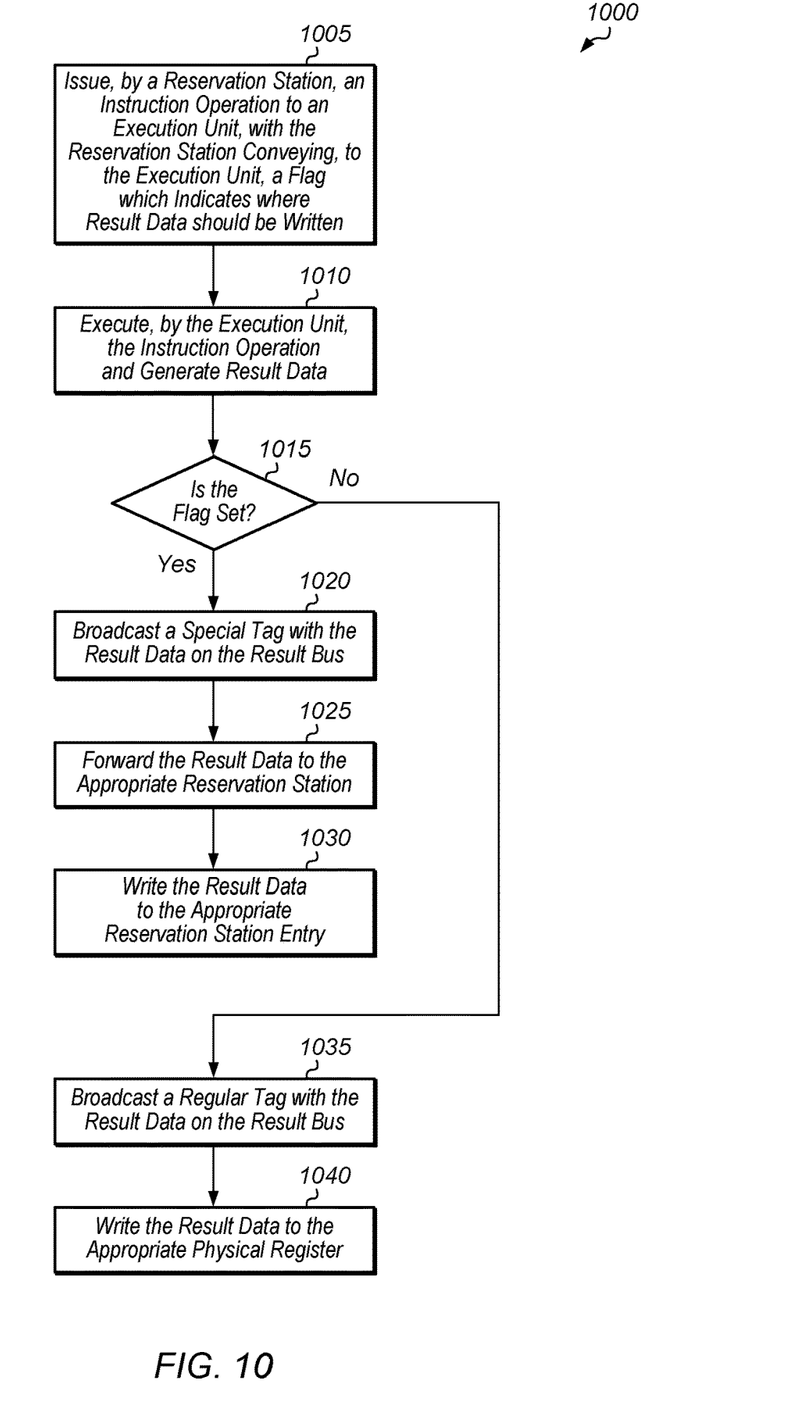
FIG. 10 is a generalized flow diagram illustrating one implementation of a method for broadcasting result data from an execution unit.

Turning now to FIG. 10, one implementation of a method 1000 for broadcasting result data from an execution unit is shown. A reservation station issues an instruction operation to an execution unit, with the reservation station conveying, to the execution unit, a flag which indicates where result data should be written (block 1005). Next, the execution unit executes the instruction operation and generates result data for the instruction operation (block 1010). If the flag is set (conditional block 1015, "yes" leg), then the execution unit broadcasts a special tag with the result data on the result bus (block 1020). In response to detecting the special tag, control logic coupled to the result bus forwards the result data to the appropriate reservation station (block 1025). Then, the reservation station writes the result data to the appropriate reservation station entry (block 1030). After block 1030, method 1000 ends.

If the flag is not set (conditional block 1015, "no" leg), then the execution unit broadcasts a regular tag with the result data on the result bus (block 1035). In one implementation, the regular tag includes a physical register number (PRN) which identifies the physical register where the result data should be written. Next, in response to detecting the regular tag, control logic coupled to the result bus writes the result data to the appropriate physical register (block 1040). After block 1040, method 1000 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A reservation station comprising:
    a plurality of entries configured to store instruction operation data; and
    control logic comprising circuitry configured to:
        store both a first instruction operation and a second instruction operation in a first entry of the plurality of entries; and
        store a result of execution of the first instruction operation in the first entry of the plurality of entries.

2. The reservation station as recited in claim 1, wherein during execution of the second instruction operation, the second instruction operation operates on the result of execution of the first instruction operation stored in the first entry of the reservation station.

3. The reservation station as recited in claim 1, wherein the control logic is configured to store one or more operands corresponding to each of the first instruction operation and the second instruction operation in the first entry of the reservation station.

4. The reservation station as recited in claim 1, further comprising a decode unit configured to decode an instruction into the first instruction operation and the second instruction operation.

5. The reservation station as recited in claim 2, wherein subsequent to execution of the second instruction operation, result data from the second instruction operation is written to a register file.

6. The reservation station as recited in claim 3, wherein the result of execution of the first instruction operation overwrites at least one operand of the one or more operands stored in the first entry of the reservation station.

7. The reservation station as recited in claim 6, wherein responsive to the result of execution of the first instruction operation being stored in the first entry, the control logic is configured to store an indication in the first entry that indicates the second instruction operation is ready to be issued.

8. A method comprising:
    storing data corresponding to both a first instruction operation and a second instruction operation in a first entry of a reservation station;
    storing a result of execution of the first instruction operation in the first entry of the reservation station.

9. The method as recited in claim 8, wherein during execution of the second instruction operation, the second instruction operation operates on the result of execution of the first instruction operation stored in the first entry of the reservation station.

10. The method as recited in claim 8, further comprising storing one or more operands corresponding to each of the first instruction operation and the second instruction operation in the first entry of the reservation station.

11. The method as recited in claim 8, further comprising decoding an instruction into the first instruction operation and the second instruction operation.

12. The method as recited in claim 9, wherein subsequent to execution of the second instruction operation, the method comprises writing result data from the second instruction operation to a register file.

13. The method as recited in claim 10, wherein the result of execution of the first instruction operation overwrites at least one operand of the one or more operands stored in the first entry of the reservation station.

14. The method as recited in claim 13, further comprising storing an indication in the first entry that indicates the second instruction operation is ready to be issued, responsive to the result of execution of the first instruction operation being stored in the first entry.

15. A processor comprising:
   a decode unit configured to decode an instruction into at least a first instruction operation and a second instruction operation;
   a reservation station comprising a plurality of entries; and
   circuitry configured to:
      store both the first instruction operation and the second instruction operation in a single entry of the reservation station;
      store a result of execution of the first instruction operation in the single entry of the reservation station.

16. The processor as recited in claim 15, wherein during execution of the second instruction operation, the second instruction operation operates on the result of execution of the first instruction operation stored in the entry of the reservation station.

17. The processor as recited in claim 15, wherein the circuitry is configured to store one or more operands corresponding to each of the first instruction operation and the second instruction operation in the single entry of the reservation station.

18. The processor as recited in claim 15, wherein the result of execution of the first instruction operation overwrites at least one operand of the one or more operands stored in the single entry of the reservation station.

19. The processor as recited in claim 15, wherein responsive to the result of execution of the first instruction operation being stored in the single entry, the circuitry is configured to store an indication in the single entry that indicates the second instruction operation is ready to be issued.

20. The processor as recited in claim 15, wherein the result of execution of the first instruction operation is stored in the single entry of the reservation station, responsive to a determination that the result is only sourced by one other instruction operation.

\* \* \* \* \*